US012767112B2

(12) United States Patent
Grzeskowiak et al.

(10) Patent No.: US 12,767,112 B2
(45) Date of Patent: Oct. 20, 2026

(54) BRAKE PRESSURE MODULATOR AND USE OF A BRAKE PRESSURE MODULATOR

(71) Applicant: ZF CV Systems Europe BV, Brussels (BE)

(72) Inventors: Adrian Grzeskowiak, Wroclaw (PL); Thomas Müller, Hannover (DE); Robert Otremba, Ronnenberg (DE); Karl-Heinz Riediger-Janisch, Hannover (DE); Pawel Swiatek, Wroclaw (PL); Leszek Toma, Wroclaw (PL); Ingo Fuhrmann, Langenhagen (DE)

(73) Assignee: ZF CV Systems Europe BV, Brussels (BE)

( * ) Notice: Subject to any disclaimer, the term of this patent is extended or adjusted under 35 U.S.C. 154(b) by 834 days.

(21) Appl. No.: 18/031,404

(22) PCT Filed: Oct. 14, 2020

(86) PCT No.: PCT/EP2020/078839
§ 371 (c)(1),
(2) Date: Apr. 12, 2023

(87) PCT Pub. No.: WO2022/078585
PCT Pub. Date: Apr. 21, 2022

(65) Prior Publication Data

US 2023/0373456 A1 Nov. 23, 2023

(51) Int. Cl.
*B60T 13/68* (2006.01)
*B60T 13/26* (2006.01)
(Continued)

(52) U.S. Cl.
CPC .......... *B60T 17/221* (2013.01); *B60T 13/268* (2013.01); *B60T 13/683* (2013.01); *B60T 2270/413* (2013.01)

(58) Field of Classification Search
CPC .... B60T 17/221; B60T 13/268; B60T 13/683; B60T 13/385; B60T 2270/413
See application file for complete search history.

(56) References Cited

U.S. PATENT DOCUMENTS

| | | | | |
|---|---|---|---|---|
| 4,054,327 A * | 10/1977 | Rebenstorf | ........... | B60T 11/326 137/118.06 |
| 11,926,294 B2 * | 3/2024 | Mueller | .................. | B60T 13/66 |

(Continued)

FOREIGN PATENT DOCUMENTS

| | | |
|---|---|---|
| CN | 101489845 A | 7/2009 |
| CN | 109383478 A | 2/2019 |

(Continued)

OTHER PUBLICATIONS

European Patent Office, Rijswijk, Netherlands, International Search Report of International Application No. PCT/EP2020/078839, Mailed Dec. 4, 2020, 4 pages.

*Primary Examiner* — Thomas W Irvin
(74) *Attorney, Agent, or Firm* — Dickinson Wright PLLC

(57) ABSTRACT

A brake pressure modulator (110; 106) includes a relay valve (202) for controlling a supply of pressurized air from a primary source (II) to at least one brake actuator (112*a*, 112*b*), a first valve sub-unit (204) configured to be electronically actuated and configured to receive a primary control pressure from the primary source (II) intended for operating the relay valve (202), and a second valve unit (206) configured to receive a secondary control pressure from a secondary source ('BST') and at least part of the primary control pressure from the primary source (II) and to transmit either the primary control pressure or the secondary control pressure to the relay valve (202). When the secondary control pressure is transmitted to the relay valve (202), the primary control pressure from the primary source (II) is disconnected.

18 Claims, 6 Drawing Sheets

(51) Int. Cl.
*B60T 13/38* (2006.01)
*B60T 17/22* (2006.01)

(56) References Cited

U.S. PATENT DOCUMENTS

| | | | | |
|---|---|---|---|---|
| 12,263,821 | B2 * | 4/2025 | van Thiel | B60T 8/171 |
| 12,539,835 | B2 * | 2/2026 | Van Thiel | B60T 8/94 |
| 2002/0167219 | A1 | 11/2002 | Kemer et al. | |
| 2010/0072810 | A1 | 3/2010 | Bensch et al. | |
| 2013/0127239 | A1 | 5/2013 | Brenninger et al. | |
| 2017/0210365 | A1 | 7/2017 | Lülfing et al. | |
| 2021/0197780 | A1 * | 7/2021 | Mueller | B60T 8/1708 |
| 2022/0266807 | A1 * | 8/2022 | van Thiel | B60T 17/221 |
| 2023/0010827 | A1 * | 1/2023 | van Thiel | B60T 15/027 |
| 2023/0012205 | A1 * | 1/2023 | van Thiel | B60T 13/683 |
| 2024/0109524 | A1 * | 4/2024 | Klostermann | B60T 13/683 |
| 2024/0198991 | A1 * | 6/2024 | van Thiel | B60T 8/171 |
| 2024/0246520 | A1 * | 7/2024 | van Thiel | B60T 13/683 |
| 2024/0317200 | A1 * | 9/2024 | van Thiel | B60T 13/665 |
| 2024/0375627 | A1 * | 11/2024 | van Thiel | B60T 7/20 |

FOREIGN PATENT DOCUMENTS

| | | | |
|---|---|---|---|
| CN | 110431054 | A | 11/2019 |
| CN | 110494334 | A | 11/2019 |
| DE | 19653264 | A1 | 6/1998 |
| DE | 102016005318 | A1 | 11/2017 |
| DE | 102018122193 | A1 | 3/2020 |
| EP | 3112230 | A1 | 1/2017 |
| WO | 2006122374 | A1 | 11/2006 |

* cited by examiner

BRAKE PRESSURE MODULATOR AND USE OF A BRAKE PRESSURE MODULATOR

FIELD

The present disclosure relates to a brake pressure modulator for a pneumatic brake system and/or for a vehicle. The present disclosure also relates to a respective pneumatic brake system and/or a vehicle.

More particularly the present disclosure relates to a brake pressure modulator for a vehicle. Preferably, the present disclosure relates to the brake pressure modulator operable by a pneumatic force that operates as, for example, a multi-relay valve for wheel end actuators associated with a pneumatic brake system. For instance, the brake pressure modulator of the present disclosure can be a pneumatic brake pressure modulator that is provided at a front and/or rear axle of the vehicle or associated with applying control pressure for the trailer brake system. In accordance with an implementation of the present disclosure, said brake pressure modulator can be used to control the braking of a towed vehicle or a trailer, generally referred to as a trailer control valve.

BACKGROUND

Electronic brake systems allow precisely controllable and rapid braking of a vehicle. In this context, the output signal of a brake signal transmitter or a brake pedal, which reflects a deceleration demand of the driver, is passed to a control unit. In the control unit, the output signal of the brake signal transmitter can be modified additionally by driving safety systems, such as an antilock braking system (or ABS), a traction control system or anti-slip regulation system (ASR), or a system for electronic stability program (ESP). From this, the control unit produces control signals, which are passed to "brake pressure modulators" or brake pressure valves, which control the supply of a pressure medium, which is generally compressed air in the case of utility or commercial vehicles, to the individual braking devices or brake cylinders in a manner specific to the wheel or axle-wise by way of electropneumatically actuatable valve arrangements.

In the event that said control unit or the electronic part(s) of the control unit fails, e.g. because the power supply thereof is interrupted, the electronic brake system is generally provided with a pneumatically controllable redundant system associated with the service brake in order to ensure a braking option is available when the electronic system or a part of the electronic system fails. Such requirements to enable redundant operational capability of braking systems in the vehicles are even stipulated in a variety of braking legislations in different parts of the world. For instance, UN-ECE Reg. No. 13, in the paragraph 5.2.1.18.3. provides one such requirement for trailer brakes in the situations, for instance, when an electric line is found to be defective.

It should however be noted that the conventional brake pressure modulators facilitating the pneumatic redundant system within an electro-pneumatic brake system are known.

Brake pressure modulators for controlling the pressurized air flow to the brake actuators associated with either a front axle or to the brake actuators associated with the trailer have been known in the art. For instance, US patent publication US 2017/210365 further discloses a conventional brake pressure modulator.

For another instance, EP3112230 A1 discloses a parking brake valve, among others, with a possibility of pneumatic redundant braking when e.g., an electronic failure at one or more components associated with said parking brake valve occurs.

For yet another instance, DE102018122193 A1 discloses a front-axle valve package and/or a trailer control valve with a possibility of having a pneumatic redundant braking control.

For the sake of illustration, a conventional brake pressure modulator 400 is also shown in FIG. 4 of the present application. This figure has also been clearly demarcated as 'prior art' in the drawings accompanying the present application. While the general functioning of brake pressure modulator 400 will be derivable to the person skilled in the art of the vehicle brake systems and from the above cited US patent publication no. US2017/210365, it is nevertheless shortly (to the extent necessary) explained herewith.

As can be derived from FIG. 4, in order for service brake pressure inlet 410 to be connected with service brake pressure outlet 412, a relay valve 402 should be activated. In accordance with the conventional brake pressure modulator 400, a pneumatic pressure is applied for actuating relay valve 402 in order to selectively enable or disable such a connection between inlet 410 and outlet 412. This control pressure is derived from control pressure inlet 408 receiving pressurized fluid from a reservoir via brake signal transmitter (BST). As can also be derived from FIG. 4, the activation of relay valve 402 is, however, dependent on receiving the control pressure supply from e.g., a first valve unit 404 and/or a second valve unit 406. Based on the activation states of first and second valve units 404 and 406, the pressurized air is supplied to relay valve 402. It is noted that there are also default positions for first and second valve units 404 and 406 in which the pressurized air is supplied to relay valve 402 via one of the two valve units 404 and 406 as safety precaution. In other words, should the electronic control of valve units 404 and 406 not work, they retain default positions which will still enable the pressurized air supply for actuating relay valve 402. The default positions of each of 2/2 solenoid valves provided in first and second valve units 404 and 406 will guarantee that the required connection between inlet 410 an outlet 412 is established so that during emergency brake application scenarios, when the driver presses the brake pedal (not shown in FIG. 4), the control pressure is still supplied to the relay valve 402 to be activated. Such solutions may be referred to as safety braking solutions and may for instance sometimes be stipulated by brake regulations.

It follows from the above that valve units 404 and 406 however can only be electronically actuated. Therefore, if valve units 404 and 406 require changing of positions from a 'default' position, solenoids of the respective valve units are indispensable. Furthermore, this requires additional wiring and related provisions within conventional brake pressure modulator 400. Needless to say, this has a direct effect on the cost of the product due to additional manufacturing and constructional costs that using electronically controlled solenoids entail, but at the same time complying with the safety requirements of the regulations.

FIG. 5 shows a cross-sectional view of conventional brake pressure modulator 400 where the location of valves 406, 404*a* and 404*b* is shown. Furthermore, inlets 408, 410, of modulator can also be located. However, in this context, what is more important is the location of valve 406.

As can be noticed, three electronically actuatable valves 404*a*, 404*b* and 406 are placed in parallel positions within a housing 502 of brake pressure modulator 400. As mentioned above, providing spatial allocation for three valves 404*a*, 404*b* and 406 arranged in parallel to each other and each of them being solenoid actuated may not be cost-effective.

It follows from the above, one of the cost-effective solutions is, for instance, to use a mechanically operable valve instead of solenoid valves, which can be found in e.g., German application DE 10 2018 122 193 A1 filed also by the Applicant of the present application. However, one of the challenges is the implementation of such an idea is the design constraints involved within the brake modulator when the mechanically operable valve is utilized and at the same time to achieve same function of the electronically operated valves. It is one of the objectives to reduce to the costs on wiring and other details of the brake pressure modulators such as conventional brake pressure modulator 400, but at the same time providing the same functionality as the electronically operated valves and complying with the spatial constraints within the brake pressure modulators.

SUMMARY

It follows from the above section that the cost-effective solution is not only in replacing e.g., the existing solenoid valve with a mechanical valve, but obtaining the same functionality using said mechanical valve taking the spatial constraints within the brake pressure modulators into account.

It is an object of the present disclosure is to provide a brake pressure modulator wherein said mechanically operable valve is established and integrated in the brake pressure modulator in an advantageous way observing the above conditions.

This objective is achieved through the aspects of the present disclosure described herein.

In accordance with an embodiment of the present disclosure, a brake pressure modulator is provided, wherein said modulator includes a relay valve for controlling a supply of pressurized air from a primary source (II) to at least one brake actuator,

- a first valve sub-unit configured to be electronically actuated, wherein the first valve sub-unit is configured to receive a primary supply pressure form the primary source (II) as well as a connection to the ambient air for exhaust purposes, intended for controlling the relay valve, and
- a second valve unit configured to at least receive a secondary control pressure from a secondary source ('BST') and at least part of the primary control pressure from the primary source (II) and to transmit either the primary control pressure or the secondary control pressure to the relay valve, wherein,
- when the secondary control pressure is transmitted to the relay valve, the primary control pressure from the primary source (II) is disconnected, and/or
- when the primary control pressure is transmitted to the relay valve, the secondary control pressure from the secondary source is disconnected, and the second valve unit is a mechanically operable valve.

Furthermore, according to the present disclosure, the second valve unit is a double-sided check valve that is configured to selectively transmit the pressure of a higher magnitude among the primary and secondary control pressure received from the primary source (II) and the secondary source (BST), respectively, wherein the first valve sub-unit includes at least two solenoid controlled valves, wherein an outlet of a first one of the at least two solenoid controlled valves leads to an inlet of said double check valve and to an inlet of a second one of the at least two solenoid controlled valves.

One of the technical advantages of providing the mechanically operable valve for the second valve unit is, unlike the second valve unit of conventional brake modulators with an electronically controlled solenoid valve, space for wirings and other hardware requirements associated with the solenoid valve are done away with. This has a direct effect on the cost of the product as well as makes the brake pressure modulator more self-reliant and not always dependent on electronic control. In this certain way, the redundant functioning (or functioning of the brake modulator without electronic control) is boosted, at the same time satisfying the safety requirements of the pneumatic braking system. The double-sided check valve enables a simple mechanism in which selective transmission of the brake pressure is taken care of, as only one of the pressure lines can be connected to the relay valve for its actuation and, as a result, similar control as that which is achieved due to the usage of solenoid valves is achieved using the double-sided check valve.

Another technical advantage of the above-mentioned embodiment is that by enabling the connection between the outlet of the first one of the at least two solenoid controlled valves and the inlet of said double check valve and, at the same time, the inlet of the second one of the at least two solenoid controlled valves, the structural connection is comparatively simplified. Just for the sake of explanation of this technical advantage, the disclosure from e.g., DE102018122193A1 is cited herewith. The structural connections existing within the first valve sub-unit from DE102018122193A1 is rather complicated in that it makes the overall functioning of the brake pressure modulator before the control pressure reaches the double check valve rather intricate. It is one of the objectives of the present disclosure to simplify the design of the pre-control region (or the construction of the first valve sub-unit) of the brake pressure modulator before the control pressure from the primary source (II) reaches the double check valve.

These and further developed configurations of the present are further outlined herein, including further embodiments and associated technical advantages. Thereby, the mentioned advantages of the proposed concept are even more improved. For each feature described herein, it is claimed independent protection from all other features of this disclosure.

In accordance with the same development as above, in which the brake pressure modulator is described, the double-sided check valve includes a spool with two opposing sides, wherein a first one among the two opposite sides receives the pressurized air from the primary source (II) and a second one among the two opposite sides receives the pressurized air from the secondary source (BST). The resulting configuration as provided in this development enables a mechanism that can translate the selective application through simple hardware means i.e., the spool configuration. The linear translation of the spool enables which supply of the pressurized air, i.e., whether from the secondary source or from the primary source, be given priority, based on the respective magnitude of the pressure.

In accordance with one or more of the above developments, in which the brake pressure modulator is described, the double-sided check valve includes a casing which covers the spool, wherein the spool is configured to linearly translate within the casing, and wherein the direction of movement of the spool within the casing is directly dependent on a difference in the magnitude of the pressure received from primary source (II) and the secondary source (BST). It is one of the most advantageous developments of the present disclosure where the mechanically operable spool valve enables the Boolean operation of supplying the connection with a higher pressure air supply. The surface interaction between the spool and the casing enables realizing the simple mechanism of a three port, two position configuration direction control valve with a minimal number of components.

In a further development of the present disclosure, the casing includes a shoulder portion to limit the linearly translating movement of the spool in at least one of the two directions ('L' or 'R'). By providing such a shoulder portion to limit the movement of the spool, a minimal movement of the spool required to establish a fluid connection is created, further complying with the dimensional restrictions of the arrangement of the double-sided check valve within the brake pressure modulator.

In accordance with yet a further development, the two opposing sides of the spool include first and second conical depressions. In accordance with an exemplary implementation, the cross-sectional profiles of the first and second conical depressions and are same. For instance, such conical depressions ensure the functional integrity of the double check valve so that when all other physical conditions are same, only the minute difference in the magnitude of the pressure experienced at each of the first and second sides should be the factor which contributes to the linear (translatory) motion of the spool, e.g., from one side to another.

As a further development of the double-sided check valve, the double check valve further includes an external sleeve within which the casing is disposed, and wherein at least one sealing ring is provided between the external sleeve and the casing so as to establish an air-tight assembly between them.

In the same or different development, in which the brake pressure modulator of the present invention is described, the first valve sub-unit includes two solenoid controlled valves, which are 2/2 solenoid controlled direction control valves and wherein, based on an actuation state of each of the two direction control valves, the brake pressure modulator is configured to perform one of the following functions:

- enabling the supply of the primary control pressure from the primary source (II) to actuate the relay valve;
- disabling or blocking the supply of the primary control pressure from the primary source (II) to the relay valve; and/or
- releasing the primary control pressure from the primary source (II) to the atmosphere, wherein the primary control pressure is intended for operating the relay valve. In combination with the simple mechanically operable valve, electronically or solenoid controlled direction valves configure the complex operation of connecting and/or venting the control pressure form the primary source such as reservoir II in a straight forward manner.

In a development, in which the brake pressure modulator is described, the relay valve, the first valve sub-unit, and the second valve unit are encompassed within a single cast body of the brake pressure modulator. For an ease of manufacture, all the components are incorporated in a single cast unit. For instance, aluminum or cast iron could be used make the cast body of the brake pressure modulator.

The brake pressure modulator of any one of the above developments may be provided, wherein the brake pressure modulator is for controlling supply of the pressurized air to the brake actuators associated with a front axle (FA) of a vehicle.

In accordance with a particularly preferred embodiment of the present invention, the brake pressure modulator further includes a pressure sensor, wherein said pressure sensor is a Pulse-Width-Modulation (PWM) based pressure sensor. The technical advantage, for instance, when brake pressure modulators such as the one disclosed in the present disclosure are used in an environment with external disturbances, the usage of PWM based pressure sensor may enable providing highly accurate pressure readings. Moreover, it is also noted that the technical purpose of providing PWM based pressure sensor as the pressure sensor for the brake pressure modulator is for enabling compliance according to "functional safety" requirements as per ISO standard 26262.

As an aspect of the present disclosure, a pneumatic brake system is disclosed, which system includes the brake pressure modulator of one or more of the above discussed developments, a centralized pressure modulator connected to the brake pressure modulator, and a centralized electronic control unit operatively connected with the centralized pressure modulator, wherein the centralized electronic control unit transmits control signals to at least the first valve sub-unit. In another development, a vehicle comprising the pneumatic brake system is disclosed.

As another aspect of the present disclosure, use of the brake pressure modular of any one of the above aspects, developments or embodiments as a trailer control valve is provided.

As a yet another aspect of the present disclosure, use of the brake pressure modulator of any one of the above aspects, developments or embodiments as a rear axle brake pressure modulator is provided.

For a more complete understanding of the present disclosure, the disclosure will now be described in detail with reference to the accompanying drawing. The detailed description will illustrate and describe what is considered as a preferred embodiment of the present disclosure. It should of course be understood that various modifications and changes in form or detail could readily be made without departing from the spirit of the present disclosure. It is intended that the present disclosure may not be limited to the exact form and detail shown and described herein, nor to anything less than the whole of the invention disclosed herein and as claimed hereinafter. Further the features described in the description, the drawings, and the claims disclosing the present disclosure may be essential for the invention considered alone or in combination. In particular, any reference signs in the claims shall not be construed as limiting the scope of the invention. The wording "comprising" does not exclude other elements or steps. The wording "a" or "an" does not exclude a plurality. The wording, "a number of" items, comprises also the number one, i.e. a single item, and further numbers like two, three, four and so forth.

Figure 3A:
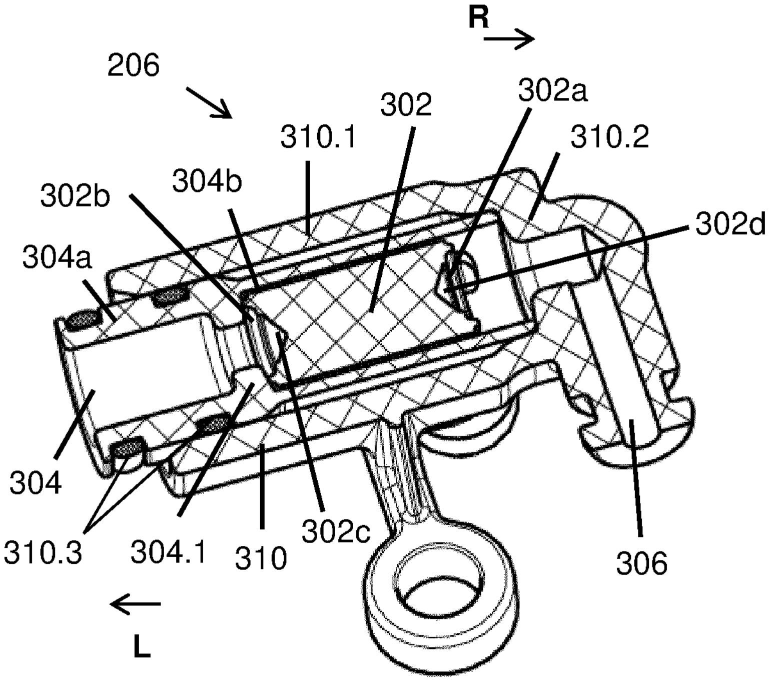
Figure 3B:
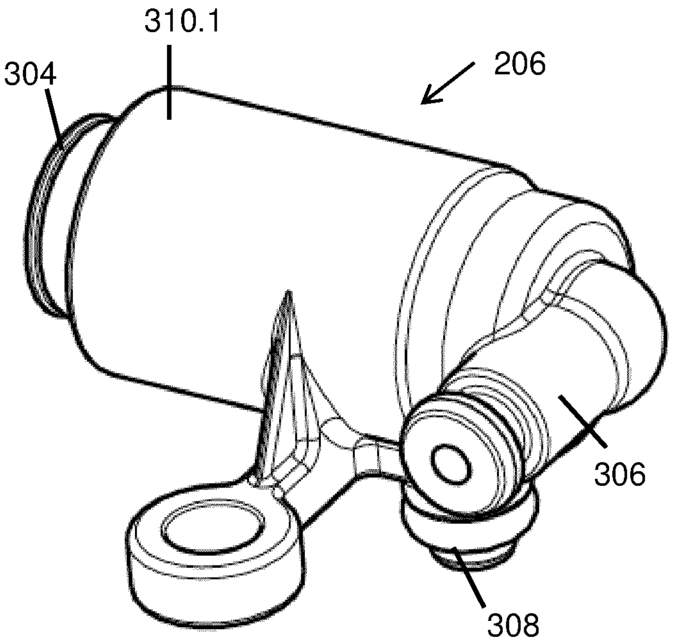
Figure 3C:
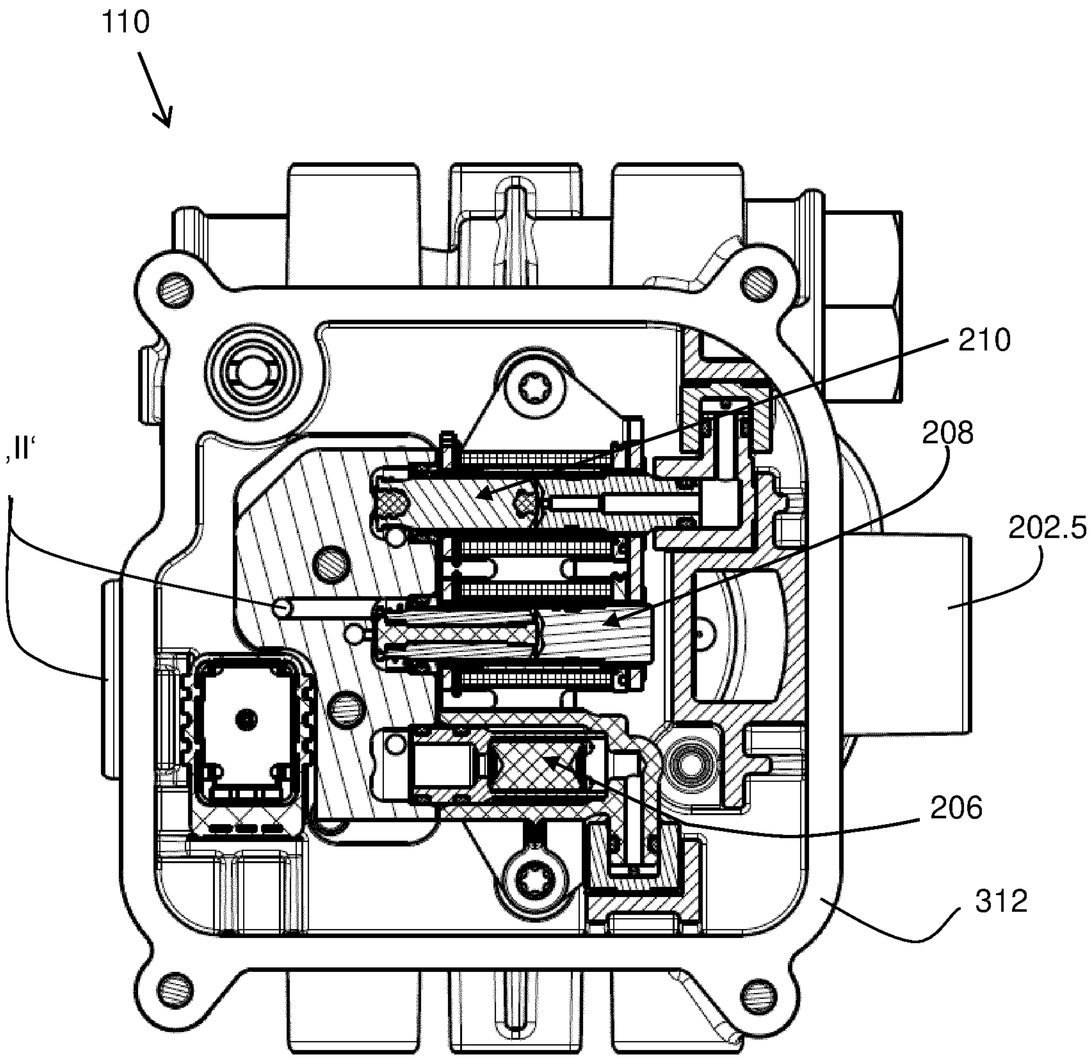
Figure 4:
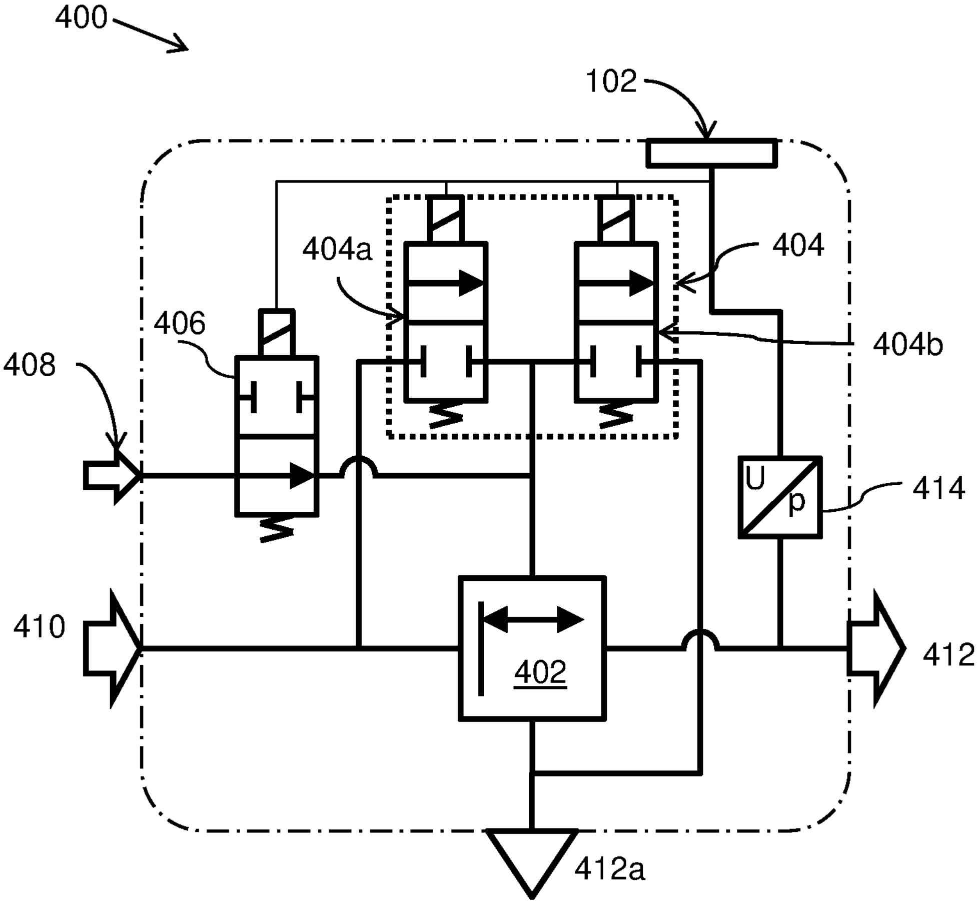
(prior art) Fig. 4

FIG. **3*a*** illustrates a cut-section of a double-sided check valve in accordance with an embodiment of the present disclosure;

FIG. 3*b* illustrates a perspective view of a double-sided check valve in accordance with an embodiment of the present disclosure;

FIG. 3*c* illustrates a cross-sectional view of a brake pressure modulator in accordance with an embodiment of the present disclosure;

FIG. 4 illustrates a conventional brake pressure modulator; and

Figure 5:
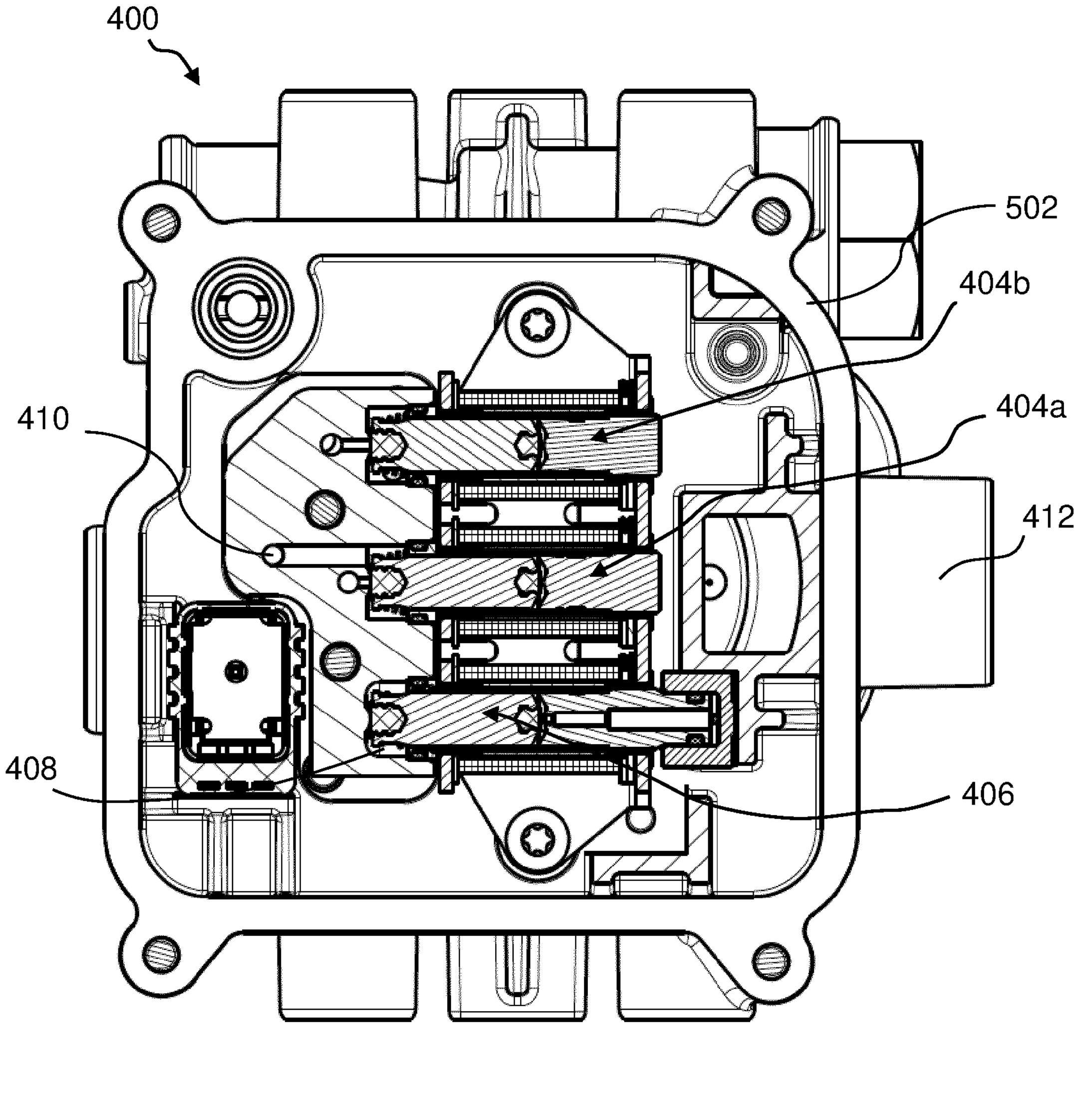
(prior art) Fig. 5

FIG. 5 illustrates a cross-sectional view of the conventional brake pressure modulator.

Further details and advantages of different components are explained in the detailed description provided below. The labeling of the elements of different drawings is not to be construed as limiting. The scope of the present disclosure is defined by one or more claims listed under 'claims' section.

For identical or equivalent items or items of identical or equivalent function in the following the some reference marks are used. For corresponding features thus it is referred to the above description.

DETAILED DESCRIPTION

Figure 1:
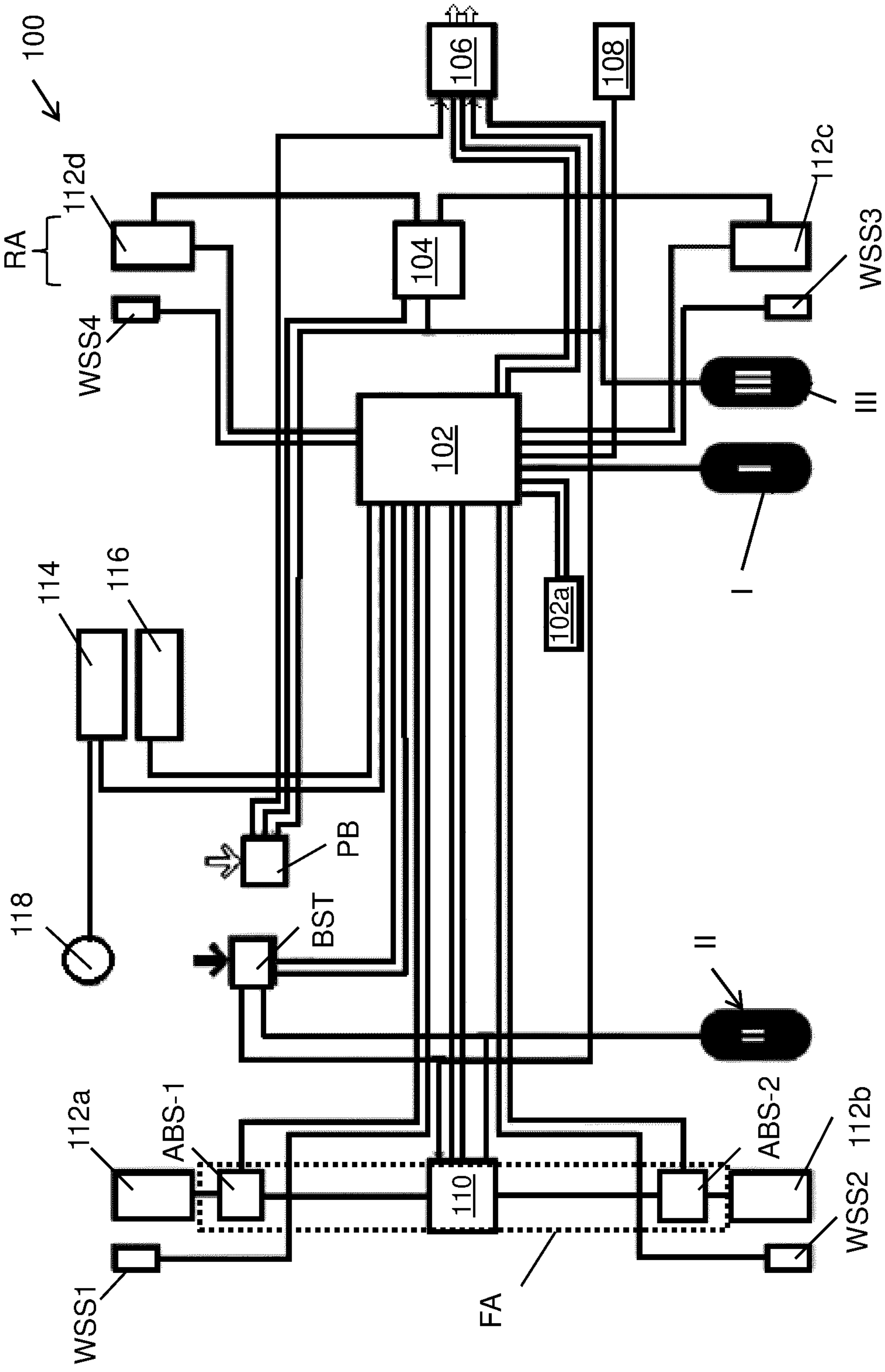
FIG. 1 illustrates a pneumatic brake system of a vehicle in accordance with an embodiment of the present disclosure.

FIG. 1 illustrates a pneumatic brake system 100 of a vehicle (not labeled) in accordance with an embodiment of the present disclosure. Alternatively, the vehicle (not labeled) includes pneumatic brake system 100.

Pneumatic brake system 100 in general includes a centralized (brake) pressure modulator 102, which is configured, inter alia, to receive a brake control input in the form of control pressure from a brake signal transmitter (labeled as 'BST' in FIG. 1) and in a preferred embodiment, to receive electronic signals from Electronic Stability Controller Module (ESCM) 102*a* connected to it via e.g., CAN (Controller Area Network) bus. In a further preferred embodiment, centralized pressure modulator 102 is also connected to a Power Line Carrier (PLC) 108 that is, for example, connected to a trailer (not shown in FIG. 1). It is noted that the driver of the vehicle actuates a brake pedal or BST to supply brake pressure to wheel end actuators 112*a*, 112*b*, 112*c*, 112*d* associated with different wheels (not shown in the figure).

In modern pneumatic brake systems such as the one shown in FIG. 1, the BST simply transmits an electronic signal using a stroke sensor (not shown in FIG. 1) to read a control output from a brake pedal (not shown in FIG. 1) to a central brake pressure modulator unit provided in combination with centralized pressure modulator 102. Said stroke sensor (not shown in FIG. 1) is configured to read or determine the movement of a plunger as a result of the driver applying pressure on the brake pedal.

On receiving the control inputs from the BST, centralized pressure modulator 102 transmits control pressure to the brake pressure modulators, in particular to the ones located at front axle 'FA' as well as to the brake pressure modulator assigned for trailer brakes. In FIG. 1, the brake pressure modulator assigned for the front axle brakes is labeled as "110" and the brake pressure modulator assigned for the trailer brakes is labeled as "106". From the respective brake pressure modulators, the control pressure is transferred to respective wheel end actuators 112*a*, 112*b*, 112*c* and 112*d* through which the vehicle brakes are applied.

Furthermore, there different accumulators or reservoirs displayed in FIG. 1 are for supplying pressurized air to different receivers present within pneumatic brake system 100. For instance, reservoir 'I' is configured to supply pressurized air to wheel end actuators 112*c* and 112*d* present at the rear axle of the vehicle whereas reservoir 'III' is predominantly for applying parking brakes and supplying pressurized air to trailer brake pressure modulator 106. Reservoir 'II' is for supplying pressurized air to front axle brake control modulator 110.

Pneumatic brake system 100 of the present embodiment also additionally discloses wheel speed sensors WSS1, WSS2, WSS3 and WSS4 located at each of the wheels to determine their rotational speeds, a CAN network unit 114 (refers to a networking unit operating via CAN protocol), an on-board battery 116, and a steering angle sensor 118. The functioning of these components is not part of the present invention and therefore, no further explanation is provided in this regard.

Additionally, pneumatic brake system 100 includes also park brake control unit denoted as—PB—in FIG. 1. For instance, PB is connected to brake pressure modulator 104, which in accordance with an embodiment used for modulating parking brakes, and which is also associated with the spring brakes (or e.g., the actuators 112*c* and 112*d*) of a rear axle, (denoted as—'RA'—in FIG. 1).

Further details of brake pressure modulators 110 and/or 106 of the present disclosure are provided in the forthcoming sections. To the extent the subject-matter of the present invention relates to the brake pressure modulator 110 associated with front axle FA of the vehicle, the underlying features of the claimed invention and the technical teaching associated with the brake pressure modulators provided at other parts of pneumatic brake system 100, including centralized pressure modulator 102, trailer brake pressure modulator 106 and exceptionally, rear axle pressure modulator 104.

Figure 2:
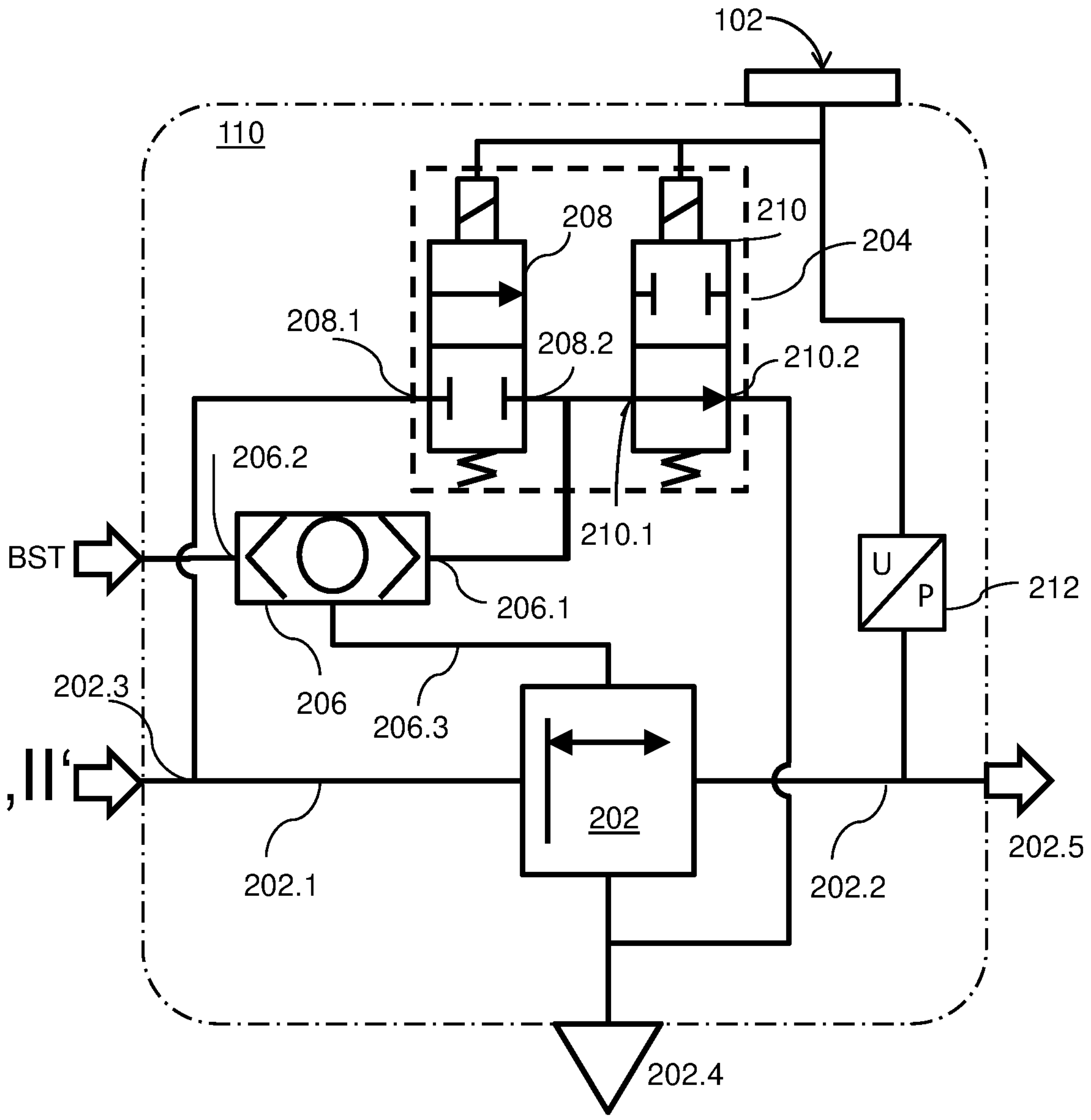
FIG. 2 illustrates a brake pressure modulator in accordance with an embodiment of the present disclosure.

FIG. 2 illustrates a brake pressure modulator 110 in accordance with an embodiment of the present disclosure.

As shown in FIG. 2, brake pressure modulator 110 includes a relay valve 202 for controlling a supply of pressurized air from a primary source (II) to at least one brake actuator of 112*a*, 112*b* (see FIG. 1). For instance, actuation of relay valve 202 enables connection between supply lines 202.1 and 202.2. Supply line 202.1 is connected to reservoir 'II' (see FIG. 1) whereas supply line 202.2 leads to Anti-lock Braking System valves ABS-1 and ABS-2 (see FIG. 1) and consequently, to wheel end actuators 112*a* and 112*b*.

However, in order to open and/or close relay valve 202, typically, a control pressure is required. As can be derived from FIG. 2, this control pressure is received from a second valve unit 206. Second valve unit 206, in accordance with the present embodiment is a mechanically operable valve. In turn, second valve unit 206 receives control pressure inputs from either of control input lines 206.1 and 206.2. In an exemplary embodiment, control input line 206.1, for instance, is connected to a first valve sub-unit 204 whereas control input line 206.2 is connected to BST (see FIG. 1).

In accordance with the present embodiment, first valve sub-unit 204 is configured to be electronically actuated, wherein first valve sub-unit 204 is configured to receive a primary control pressure from the same primary source such as reservoir 'II' intended for operating relay valve 202. For instance, see e.g. reference sign 202.3 where connection to reservoir II is shown to bifurcate, wherein one leads to supply line 202.1 and another leads to port 208.1 of a first solenoid controlled 2/2 direction control valve 208 of first valve sub-unit 204.

Further, in accordance with the same embodiment, second valve unit 206 is configured to at least receive a secondary control pressure from a secondary source (such as 'BST' of FIG. 1) and at least part of the primary control pressure from the primary source (such as reservoir 'II' of FIG. 1) and to transmit either the primary control pressure or the secondary control pressure to relay valve 202, in particular for activation of relay valve 202 to e.g., open, and wherein, when the secondary control pressure is transmitted to relay valve 202, the primary control pressure from the primary source (such as reservoir 'II' of FIG. 1) is disconnected.

Furthermore, in a preferred embodiment, first valve sub-unit 204 includes at least two solenoid controlled valves 208, 210 (more on this below). An outlet 208.2 of a first one 208 of at least two solenoid controlled valves 208, 210 leads to an inlet 206.1 of said double check valve 206 and to an inlet of a second one 210 of the at least two solenoid controlled valves 208, 210. As mentioned also in the summary section above, the technical advantage of enabling the connection between outlet 208.2 of the first one of the at least two solenoid controlled valves 208, 210 and inlet 206.1 of said double check valve 206 while at the same time enabling the connection between outlet 208.2 and inlet 206.1 of second one 210 of the at least two solenoid controlled valves 208, 210 is that the structural connection is comparatively simplified. A skilled person would appreciate this when it is seen in comparison to e.g., DE102018122193A1. The structural connections existing within the first valve sub-unit from DE102018122193A1 is rather complicated in that it makes the overall functioning of the brake pressure modulator disclosed, before the control pressure reaching double check valve 206, rather intricate. It is one of the objectives of the present invention to simplify the design of the pre-control region (e.g., region associated with first valve sub-unit 204) of brake pressure modulator 110 before the control pressure from the primary source (II) reaches double check valve 206.

In accordance with a preferred embodiment, it should be noted that second valve unit 206 receives at least part of the primary control pressure from the primary source via first valve sub-unit 204. In accordance with the present embodiment, wherein said two solenoid control valves 208, 210 are two solenoid controlled "2/2" direction control valves 208, 210 and wherein, based on an actuation state of each of the two direction control valves 208 and 210, brake pressure modulator 110 is configured to perform one of the following functions:

- enabling the supply of the primary control pressure from the primary source (II) to actuate relay valve 202;
- disabling or blocking the supply of the primary control pressure from the primary source (II) to relay valve 202; and
- releasing the primary control pressure from the primary source (II) to the atmosphere, wherein the primary control pressure is intended for operating relay valve 202.

An additional function of releasing the primary control pressure towards second valve unit 206 is also provided, which will be explained below.

The functions listed above will be explained in detail as follows.

For instance, when first solenoid controlled 2/2 direction control valve 208 is in an open state, supply of at least part of the primary control pressure from the primary source such as reservoir II is allowed. When said valve 208 is in closed state, the supply of the primary control pressure from the primary source (II) to relay valve 202 is either disabled or blocked. In the same example, when valve 208 is in the open state, the primary control pressure exits valve 208 at port 208.2.

It follows from the above, when second controlled 2/2 direction control valve 210 is in an open state, the primary control pressure is exhausted at port 202.4. However, when second solenoid controlled 2/2 direction control valve 210 is closed, the primary control pressure from valve 208 is directed to port 206.1 of second valve unit 206. In accordance with this embodiment, valve 210 includes first and second connection ports 210.1 and 210.2 where first connection port 210.1 is configured to act as inlet port for valve 210 and second connection port 210.2 is configured to act as outlet port for valve 210.

Further, in the present embodiment of brake pressure modulator 110, the second valve unit 206 is a double-sided check valve 206 that is configured to selectively transmit the pressure of a higher magnitude among the primary and secondary control pressure received from the primary source (II) and the secondary source (BST), respectively. For instance, more details on double-sided check valve 206 and its functioning are explained in conjunction with FIGS. 3*a* and 3*b* below.

The primary technical advantage of the presence of double-sided check valve 206 is to, for instance, prevent additional wiring elements and associated space constraints by simply providing a mechanical solution that is workable in all pressure differential conditions. For instance, a minor difference in pressure magnitude between the pressurized air received from e.g., ports 206.1 and 206.2 causes a spool 302 (see FIG. 3*a*) to move. This provides the pressure with higher magnitude to be supplied for actuating relay valve 202 and makes a connection between lines 202.1 and 202.2. For a manufacturer, such as the Applicant, considering the number of products manufactured, this results in also considerable cost savings.

Still further, as mentioned before, in brake pressure modulator 110 of the present embodiment, double-sided check valve 206 includes the spool 302 (see FIG. 3*a*), in particular, with two opposing sides 302*a* and 302*b* (see FIG. 3*a*), wherein a first one among the two opposite sides receives the pressurized air from the primary source (II) e.g., via port 206.1 and a second one among the two opposite sides receives the pressurized air from the secondary source (BST) e.g., via port 206.2.

In accordance with one of the advantageous embodiments of the present application, double-sided check valve 206 includes a casing (e.g., 304 or 310 of FIG. 3*a*) which covers the spool 302 (see FIG. 3*a*), wherein the spool 302 is configured to linearly translate within the casing (e.g., 304 or 310 of FIG. 3*a*), and wherein the direction of movement of the spool 302 within the casing 304 or 310 is directly dependent on a difference in the magnitude of the pressure received from primary source (II) and the secondary source (BST). Further details on the type of functioning of double-sided check valve 206 and its technical characteristics are explained in reference to FIGS. 3*a* and 3*b* below.

Finally, a pressure sensor 212 is provided in supply pressure line 202.2 connecting relay valve 202 and port 202.5, which connects to actuators 112*a* and 112*b*. This pressure sensor 212 sends readings to centralized brake pressure modulator 102, for instance, to determine the presence of flow of pressurized air in line 202.2 and/or the magnitude of the pressure in said line. In accordance with a preferred embodiment, pressure sensor 212 is Pulse-Width-Modulation (PWM) based pressure sensor. As an exemplary explanation, it is mentioned herewith that the PWM based pressure senor provides a pulse-width-modulated output of pressure readings in e.g., line 202.2. For instance, when brake pressure modulators such as the one disclosed in the present invention are used in an environment with external disturbances, the usage of PWM based pressure sensor may enable providing highly accurate pressure readings. For another instance, the technical purpose of providing PWM based pressure sensor as pressure sensor 212 is for enabling compliance according to "functional safety" as per ISO standard 26262.

In an exemplary embodiment, it should be noted that valves 208, 210 are electronically actuatable based on the pressure modulating signals received from centralized pressure modulator 102. For instance, electronically controlled braking processes such as Electronic Braking System, anti-roll braking methods, anti-skid braking methods, anti-jack-knifing methods are implemented through the controlled logic stored in centralized pressure modulator 102 which naturally may include an electronic processing unit or electronic control unit of suitable caliber.

FIG. 3*a* illustrates a cut-section of double-sided check valve 206 in accordance with an embodiment of the present invention.

In accordance with the present embodiment, double-sided check valve 206 includes spool 302 with two opposing sides 302*a* and 302*b*, and a casing 304 within which spool 302 is configured to linearly translate or move in a linear fashion. The direction of movement of spool 302 within casing 304 is governed by which one of the sides 302*a* and 302*b* the pressurized air hits or which one of sides 302*a* and 302*b* of spool 302 experiences a pressure of higher magnitude. Alternatively, the 'sides' mentioned within the context of the present embodiment may also be called 'surfaces' or 'contact surfaces' of spool 302. The pressurized air is configured to either enter via a first inlet 304*a* present as part of casing 304 or via a second inlet 306. In accordance with one embodiment, the pressurized air entering the first inlet 304*a* is from BST (see FIG. 1) whereas the pressurized air entering the second inlet 306 is from first valve sub-unit 204 (see FIG. 2).

Furthermore, as shown in FIG. 3*a*, each of two opposing sides 302*a* and 302*b* includes a first and second conical depressions 302*c* and 302*d*. Said conical depressions 302*c* and 302*d* enable better reception (due to its depressed profile) of pressurized air such that its impact is better received at spool 302. In accordance with an exemplary implementation, the cross-sectional profiles of first and second conical depressions 302*c* and 302*d* are the same. For instance, such conical depressions ensure the functional integrity of double check valve 206 so that when all other physical conditions are the same, only the minute difference in pressure experienced at each of first and second sides 302*a* and 302*b* should be the factor which contributes to the linear (translatory) motion of spool 302.

If the pressure entering inlet 304 is of higher magnitude and impacts side 302*b*, spool 302 is configured to move from 'left' marked as 'L' in FIG. 3*a* towards 'right' marked as 'R' in FIG. 3*a*. Alternatively, if the magnitude of pressure entering inlet 306 is of higher magnitude, spool 302 moves from 'right' (R) to 'left' (L). For instance, the movement of spool 302 can be triggered with a difference in the pressure entering first and second inlets 304*a* and 306 being approximately 0.1 Bar.

It is one of the technical advantages of the present invention that double-sided check valve 206 is configured to achieve a similar function of a 2/2 solenoid valve 406 as shown in conventional brake modulator 400 in FIG. 4, but without occupying further space for the additional wiring. This contributes to e.g., cost saving on the product i.e., the brake pressure modulator while at the same time complying with the safety requirements.

In accordance with the same embodiment, casing 304 includes a shoulder portion 304.1 to limit the linearly translating movement of the spool 302 in at least one of the two directions 'L' or 'R', as can be derived from FIG. 3*a*.

In accordance with an advantageous embodiment, casing 304 is further enclosed by an external sleeve 310. In one exemplary embodiment, external sleeve 310 is integral to casing 304. Furthermore, in accordance with an embodiment, external sleeve 310 is provided with second inlet 306 whereas first inlet 304*a* is provided at casing 304. In the same embodiment, external sleeve 310 may include a horizontal tube portion 310.1 within which casing 304 is positioned in a sliding manner with e.g. an interference fit so as to establish airtight assembly between casing 304 and external sleeve 310. Furthermore, in the present embodiment, the air-tight assembly between casing 304 and external sleeve 310 is established with the help of at least one sealing ring 310.3.

In the same or another embodiment, casing 304 may include a first shoulder stop 304*b* and external sleeve 310 may include a second shoulder stop 310.2, wherein spool 302 is configured to linearly reciprocate between first and second shoulder stops 304*b* and 310.2. In other words, said shoulder stops 304*b* and 310.2 are configured to function as stoppages for spool 302's movement.

FIG. 3*b* illustrates a perspective view of double-sided check valve 206 in accordance with an embodiment of the present invention.

In the perspective view, outlet 308 of double-sided check valve 206 is shown which is connected to a third supply line 206.3 (see FIG. 2) of double-sided check valve 206. This third supply line 206.3 leads to relay valve 202.

It is noted herewith that the underlying technical teaching of the present invention is equally applicable for the brake pressure modulator e.g., '110' of FIG. 1 that is associated with the front axle (FA) of the vehicle as well as the brake pressure modulator that is associated with the trailer e.g., '106' of FIG. 1.

FIG. 3*c* illustrates a cross-sectional view of brake pressure modulator 110 in accordance with an embodiment of the present invention.

As can be noticed in FIG. 3*c*, brake pressure modulator 110 of the present invention is shown to include double-sided check valve 206 in the exact same position as valve 406 provided in conventional brake pressure modulator 400 of FIG. 5, without effecting further detailed changes within a housing 312.

In the same embodiment, it is also clear that the spatial arrangement of each of the two solenoid controlled 2/2 direction control valves 208, 210 within brake pressure modulator 110 or 106 is the same as the spatial requirement of double-sided check valve 206.

It is one of the technical advantages of the present invention that double-sided check valve 206 of the present invention and solenoid operated valve 406 of conventional brake modulator 400, even though having exactly the same spatial constraints, they function similarly in allowing both pneumatic control from BST as well as electric control provided by first valve sub-unit 204 This, but as already mentioned throughout the application, the double-side check valve 206 of the present disclosure results in a considerable cost saving and has an effect on the total pricing of brake pressure modulators such as '110' or '106'. For a volume manufacturer, such as the applicant, this results in not only simply constructed brake pressure modulator, may also reduce the assembly costs.

LIST OF REFERENCE SIGNS USED IN THE FIGURES (PART OF THE DESCRIPTION)

100 pneumatic brake system
102 centralized pressure modulator
102a Electronic Stability Controller Module (ESCM)
104 brake pressure modulator at a rear axle (RA)
106 trailer brake pressure modulator
108 Power Line Carrier (from trailer side)
110 front axle brake control modulator
112a, 112 b brake actuators at front axle
112c, 112d brake actuators at rear axle
114 CAN network unit
116 on-board battery
118 steering angle sensor
FA, RA front axle, rear axle
WSS1, WSS2, WSS3, WSS4 wheel speed sensors associated with respective wheels
I, II, III reservoirs
PB Parking Brake
BST Brake Signal Transmitter
ABS1, ABS2 Anti-lock Braking System
202 relay valve
202.1, 202.2 supply lines
202.3 connection to reservoir II
202.4, 202.5 connection port
204 first valve sub-unit
206 second valve unit
206.1, 206.2 control input lines
208 first solenoid controlled 2/2 direction control valve
208.1, 208.2 connection ports of first solenoid controlled 2/2 direction control valve 208
210 second solenoid controlled 2/2 direction control valve
210.1, 210.2 first and second connection ports for second solenoid controlled 2/2 direction control valve 210
212, 414 pressure sensor
302 spool
302a first side of spool 302
302b second side of spool 302
302c first conical depression on side 302a
302d second conical depression on side 302b
304 casing
304.1 shoulder portion of casing 304
304a first inlet of casing 304
304b first shoulder stop (of casing 304)
306 second inlet
308 outlet
310 external sleeve
310.1 horizontal tube portion
310.2 second shoulder stop (of external sleeve 310)
310.3 sealing ring
312 housing
400 conventional brake pressure modulator
402 relay valve
404 first valve unit
404a, 404b electronically actuatable valves
406 electronically actuatable valve
408 control pressure inlet
410 inlet
412 outlet
502 housing

The invention claimed is:

1. A brake pressure modulator (110; 106), comprising:
a relay valve (202) for controlling a supply of pressurized air from a primary source (II) to at least one brake actuator (112a, 112b);
a first valve sub-unit (204) configured to be electronically actuated, wherein the first valve sub-unit (204) is configured to receive a primary control pressure from the primary source (II) intended for operating the relay valve (202); and
a second valve unit (206) configured to at least receive a secondary control pressure from a secondary source ('BST') and at least part of the primary control pressure from the primary source (II) and to transmit either the primary control pressure or the secondary control pressure to the relay valve (202), and wherein, when the secondary control pressure is transmitted to the relay valve (202) from the second valve unit (206), the primary control pressure from the primary source (II) is disconnected, and when the primary control pressure is transmitted to the relay valve (202) from the second valve unit (206), the secondary control pressure from the secondary source is disconnected, and wherein the second valve unit (206) is a mechanically operable valve,
wherein said mechanically operable valve is a double-sided check valve (206) that selectively transmits the pressure of a higher magnitude among the primary control pressure and secondary control pressure received from the primary source (II) and the secondary source (BST), respectively, to the relay valve (202) and
wherein the first valve sub-unit (204) includes at least two solenoid controlled valves (208, 210), wherein an outlet (208.2) of a first one (208) of the at least two solenoid controlled valves (208, 210) leads to an inlet (206.1) of said double-sided check valve (206) and also to an inlet (210.1) of a second one (210) of the at least two solenoid controlled valves (208, 210);
wherein the first valve sub-unit (204) includes first and second solenoid controlled 2/2 direction control valves (208, 210) and wherein, based on an actuation state of each of the first and second solenoid controlled 2/2 direction control valves, the brake pressure modulator (110; 106) performs at least one of the following functions:
enabling the supply of the primary control pressure from the primary source (II) to actuate the relay valve (202);
disabling or blocking the supply of the primary control pressure from the primary source (II) to the relay valve (202); and/or
releasing the primary control pressure from the primary source (II) to the atmosphere, wherein the primary control pressure is intended for operating the relay valve (202);
wherein a spatial arrangement or spatial requirement of each of the two solenoid controlled 2/2 direction control valves (208, 210) within the brake pressure modulator (110; 106) is the same as a spatial arrangement or spatial requirement of the double-sided check valve (206).

2. The brake pressure modulator (110; 106) of claim 1, wherein the double-sided check valve (206) includes a spool (302) having two opposite sides (302a; 302b), wherein a first one of the two opposite sides receives the pressurized air from the primary source (II) and a second one of the two opposite sides receives the pressurized air from the secondary source (BST).

3. The brake pressure modulator (110; 106) of claim 2, wherein the double-sided check valve (206) includes a casing (304) that covers the spool (302), wherein the spool (302) linearly translates within the casing (304), and wherein the direction of movement of the spool (302) within the casing (304) is directly dependent on a difference in the magnitude of the pressure received from primary source (II) and the secondary source (BST).

4. The brake pressure modulator (110; 106) in accordance with claim 3, wherein the casing (304) includes a shoulder portion (304.1) that limits the linearly translating movement of the spool (302) in at least one of the two directions ('L' or 'R').

5. The brake pressure modulator (110; 106) of claim 3, wherein the double check valve (206) further includes an external sleeve (310) within which the casing (304) is disposed, and wherein at least one sealing ring (310.3) is provided between the external sleeve (310) and the casing (304) so as to establish an air-tight assembly between them.

6. The brake pressure modulator (110; 106) of claim 5, wherein the casing (304) defines a first inlet (304*a*) and the external sleeve (310) defines a second inlet (306), and the casing includes a first shoulder stop (304*b*) and the external sleeve defines a second shoulder stop (310.2), wherein the casing is slidably received in the external sleeve in a tube portion (310.1) of the external sleeve in an interference fit in an airtight manner, and the spool (302) linearly reciprocates between the first and second shoulder stops (304*b*; 310.2) in response to differences in pressure present at the first inlet (304*a*) and the second inlet (306).

7. The brake pressure modulator (110; 106) of claim 2, wherein each of the two opposite sides (302*a* and 302*b*) of the spool (302) includes a conical depression (302*c*, 302*d*).

8. The brake pressure modulator (110; 106) of claim 7, wherein each of the conical depressions has the same cross-sectional profile such that a minute difference in pressure experienced at the opposite sides of the spool (302) causes linear translation of the spool (302), and supply of control pressure to the relay valve (202) is provided from the side of the spool (302) having the greater magnitude pressure.

9. The brake pressure modulator (110; 106) of claim 1, wherein the relay valve (202), the first valve sub-unit (204), and the second valve unit (206) in the form of the double-sided check valve are encompassed within a single cast body of the brake pressure modulator (110; 106).

10. The brake pressure modulator (110; 106) of claim 1, wherein the brake pressure modulator (110; 106) controls supply of the pressurized air to brake actuators (112*a*, 112*b*) of the at least one brake actuator that are associated with a front axle (FA) of a vehicle.

11. The brake pressure modulator (110; 106) of claim 1, further comprising a pressure sensor (212), wherein said pressure sensor (212) is a Pulse-Width-Modulation (PWM) based pressure sensor.

12. The brake pressure modulator (106; 110) of claim 1, wherein the brake pressure modulator (106; 110) is installed in a pneumatic brake system (100) comprising:

a centralized pressure modulator (102) connected to the brake pressure modulator (106; 110), and a centralized electronic control unit operatively connected with the centralized pressure modulator (102), wherein the centralized electronic control unit transmits control signals to at least the first valve sub-unit (204).

13. The brake pressure modulator (106; 110) of claim 1, wherein the brake pressure modulator (106; 110) and the pneumatic brake system (100) are installed in a vehicle.

14. The brake pressure modulator (106; 110) of claim 1, wherein the brake pressure modulator is used as a trailer control valve (106).

15. The brake pressure modulator (106; 110) of claim 1, wherein the brake pressure modulator is used as a rear axle brake pressure modulator (104).

16. The brake pressure modulator (106; 110) of claim 7, wherein, when the first solenoid controlled 2/2 direction control valve (208) is in an open state, supply of at least part of the primary control pressure from the primary source is provided via an outlet port (208.2) to the double-sided check valve (206), when the first solenoid controlled 2/2 direction control valve (208) is in a closed state, the supply of the primary control pressure to the double-sided check valve is blocked.

17. The brake pressure modulator (110; 106) of claim 16, wherein when the second solenoid controlled 2/2 direction control valve (210) is in an open state, the primary control pressure provided via the outlet port (208.2) of the first solenoid controlled 2/2 direction control valve (208) is exhausted via an outlet port (210.2) to an exhaust port (202.4), and when the second solenoid controlled 2/2 direction control valve (210) is in a closed state, primary control pressure provided via the outlet port (208.2) of the first solenoid controlled 2/2 direction control valve (208) is directed to an inlet port (206.1) of the double-sided check valve (206).

18. The brake pressure modulator (110; 106) of claim 1, wherein the first valve sub-unit (204) and the relay valve (202) are each connected to the primary source via a bifurcated connection, wherein a connection from the primary source splits such that one connection leads directly a first port (208.1) of the first valve sub-unit (204) and another connection leads directly to the relay valve (202).

* * * * *